US008762747B2

(12) United States Patent
Liu et al.

(10) Patent No.: US 8,762,747 B2
(45) Date of Patent: Jun. 24, 2014

(54) INDUCTIVE CHARGING AND DATA TRANSFER FOR MOBILE COMPUTING DEVICES ORGANIZED INTO A MESH NETWORK

(75) Inventors: Eric Liu, Santa Clara, CA (US); William Grange, San Francisco, CA (US); Manjirnath Chatterjee, Sunnyvale, CA (US)

(73) Assignee: Qualcomm Incorporated, San Diego, CA (US)

( * ) Notice: Subject to any disclaimer, the term of this patent is extended or adjusted under 35 U.S.C. 154(b) by 368 days.

(21) Appl. No.: 13/169,778

(22) Filed: Jun. 27, 2011

(65) Prior Publication Data
US 2012/0331316 A1    Dec. 27, 2012

(51) Int. Cl.
*G06F 1/00* (2006.01)
(52) U.S. Cl.
USPC ............ 713/300; 713/310; 320/107; 320/108
(58) Field of Classification Search
USPC .......................... 713/300, 310; 320/107, 108
See application file for complete search history.

(56) References Cited

U.S. PATENT DOCUMENTS

| 8,401,595 | B2* | 3/2013 | Zhu et al. | 455/574 |
|---|---|---|---|---|
| 2002/0063035 | A1 | 5/2002 | Blad et al. | |
| 2009/0106567 | A1 | 4/2009 | Baarman | |
| 2010/0015918 | A1 | 1/2010 | Liu et al. | |
| 2010/0106624 | A1 | 4/2010 | Ashrafzadeh et al. | |
| 2011/0156640 | A1* | 6/2011 | Moshfeghi | 320/108 |
| 2011/0181120 | A1* | 7/2011 | Liu et al. | 307/104 |
| 2011/0184888 | A1* | 7/2011 | Lee et al. | 705/412 |
| 2011/0316334 | A1* | 12/2011 | Shimokawa | 307/10.1 |
| 2012/0169293 | A1* | 7/2012 | Won et al. | 320/137 |
| 2012/0214536 | A1* | 8/2012 | Kim et al. | 455/522 |
| 2012/0248893 | A1* | 10/2012 | Teggatz et al. | 307/104 |
| 2013/0210378 | A1* | 8/2013 | Zhu et al. | 455/226.2 |

OTHER PUBLICATIONS

Bharani, "Wireless Charging—the Death of the Wire," Nov. 24, 2010, http://www.91mobiles.com/blog/4220/Wireless+Charging+++The+death+of+the+wires.html.
T. Hallmark, "WIS: Wireless Inventory System," Fall 2005, Mississippi State University, http://www.ece.msstate.edu/courses/design/ece4512/2005_fall/wireless_tracking/deliverablesII/Design%20Document%20final.pdf.

* cited by examiner

*Primary Examiner* — Jaweed A Abbaszadeh
(74) *Attorney, Agent, or Firm* — Kilpatrick Townsend and Stockton LLP

(57) ABSTRACT

Illustrated is a system and method to receive a data packet at a first mobile computing device that is part of a plurality of mobile computing devices organized as a mesh network, the data packet including a power up command and device identifier identifying a second mobile computing device requesting power. The system and method also include identifying a path from the first mobile computing device to the second mobile computing device, the path composed of at least the first and second mobile computing devices and including inductive links. Further, the system and method include transmitting electrical power, based upon the inductive links, from the first mobile computing device to a third mobile computing device, the third mobile computing device residing on the path from the first mobile computing device to the second mobile computing device.

15 Claims, 12 Drawing Sheets

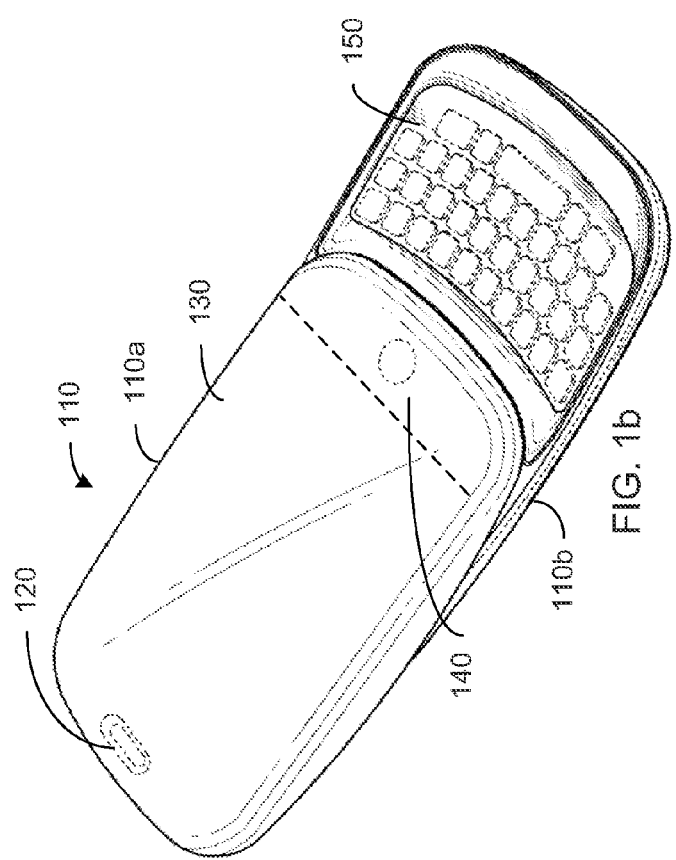
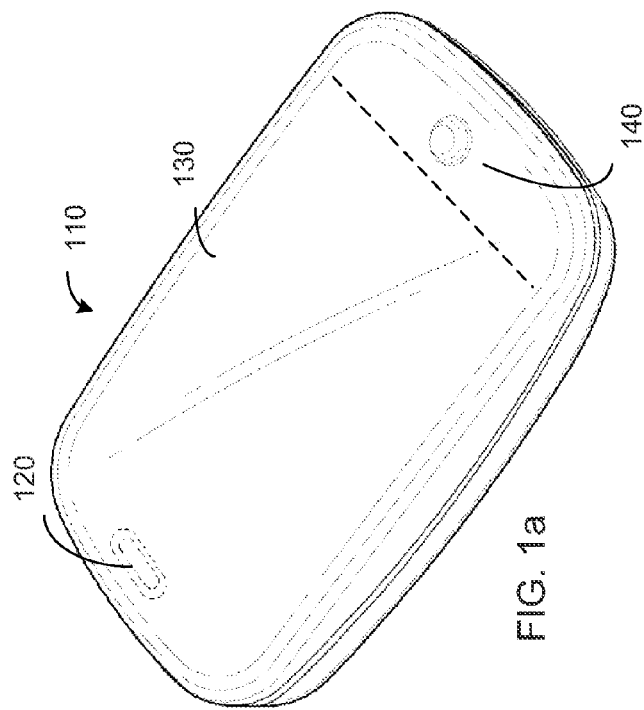
FIG. 1

US 8,762,747 B2

INDUCTIVE CHARGING AND DATA TRANSFER FOR MOBILE COMPUTING DEVICES ORGANIZED INTO A MESH NETWORK

CROSS REFERENCE TO RELATED APPLICATIONS

This application is related to U.S. patent application Ser. No. 12/478,766, filed Jun. 4, 2009, entitled INDUCTIVE SIGNAL TRANSFER SYSTEM FOR COMPUTING DEVICES; which is a continuation-in-part of U.S. patent application Ser. No. 12/239,656, filed Sep. 26, 2808, entitled ORIENTATION AND PRESENCE DETECTION FOR USE IN CONFIGURING OPERATIONS OF COMPUTING DEVICES IN DOCKED ENVIRONMENTS, which claims benefit of priority to the following applications: Provisional U.S. Patent Application No. 61/142,560, filed Jan. 5, 2009, entitled ELECTRICAL APPARATUS FOR REAL TIME WIRELESS POWER DELIVERY; Provisional U.S. Patent Application No. 61/142,194, filed Dec. 31, 2808, entitled PROTOCOL FOR REAL TIME POWER AND ACCESSORY DATA CONNECTION; Provisional U.S. Patent Application No. 61/142,195, filed Jan. 1, 2009, entitled TECHNIQUES FOR MAGNETICALLY COUPLING CHARGING CIRCUITS AND DEVICES; Provisional U.S. Patent Application No. 61/142,602, filed Jan. 5, 2009, entitled MAGNETIC CLASP WITH MULTIPLE ORIENTATIONS AND ORIENTATION DETECTION; all of the aforementioned priority applications being hereby incorporated by reference in their entirety.

BACKGROUND

Mesh networking (topology) is a type of networking where each node must not only capture and disseminate its own data, but also serve as a relay for other nodes, that is, it must collaborate to propagate the data in the network. A mesh network can be designed using a flooding technique or a routing technique.

The flooding technique may be implemented via a flooding algorithm used in distributing data to every part of a connected network. Flooding algorithms are used in systems such as: Usenet, Peer-to-Peer file sharing systems, and those used in ad-hoc wireless networks. There are several variants of flooding algorithm, but most work as follows: each node acts as both a transmitter and a receiver; and each node tries to forward every message to every one of its neighbors except the source node. This results in every message eventually being delivered to all reachable parts of the network.

The routing technique may be implemented such that the data propagates along a path, by hopping from node to node until the destination is reached. There are two types of routing techniques: a link-state protocol and a distance-vector routing protocol. The link-state protocol is performed by every node in the network (i.e. nodes that are prepared to forward data). The basic concept of link-state routing is that every node constructs a map of the connectivity to the network, in the form of a graph, showing which nodes are connected to which other nodes. Each node then independently calculates the next best logical path from it to every possible destination in the network. The collection of best paths will then form the node's routing table. A distance-vector routing protocol requires that a router informs its neighbors of topology changes periodically and, in some cases, when a change is detected in the topology of a network. Compared to link-state protocols, which require a router to inform all the nodes in a network of topology changes, distance-vector routing protocols have less computational complexity and message overhead. Distance Vector means that nodes are advertised as vectors of distance and direction. "Direction" is represented by next hop address and exit interface, whereas "Distance" uses metrics such as hop count. Nodes using distance vector protocol do not have knowledge of the entire path to a destination.

BRIEF DESCRIPTION OF THE DRAWINGS

Some embodiments of the invention are described, by way of example, with respect following figures:

FIG. 1a illustrates one example embodiment of a mobile computing device that is used to build a routing map for a mesh network, the mesh network used for the purpose of inductive charging and data transfer.

FIG. 1b illustrates one example embodiment of a mobile computing device that is used to build a routing map for a mesh network, the mesh network used for the purpose of inductive charging and data transfer.

DETAILED DESCRIPTION

Figure 2:
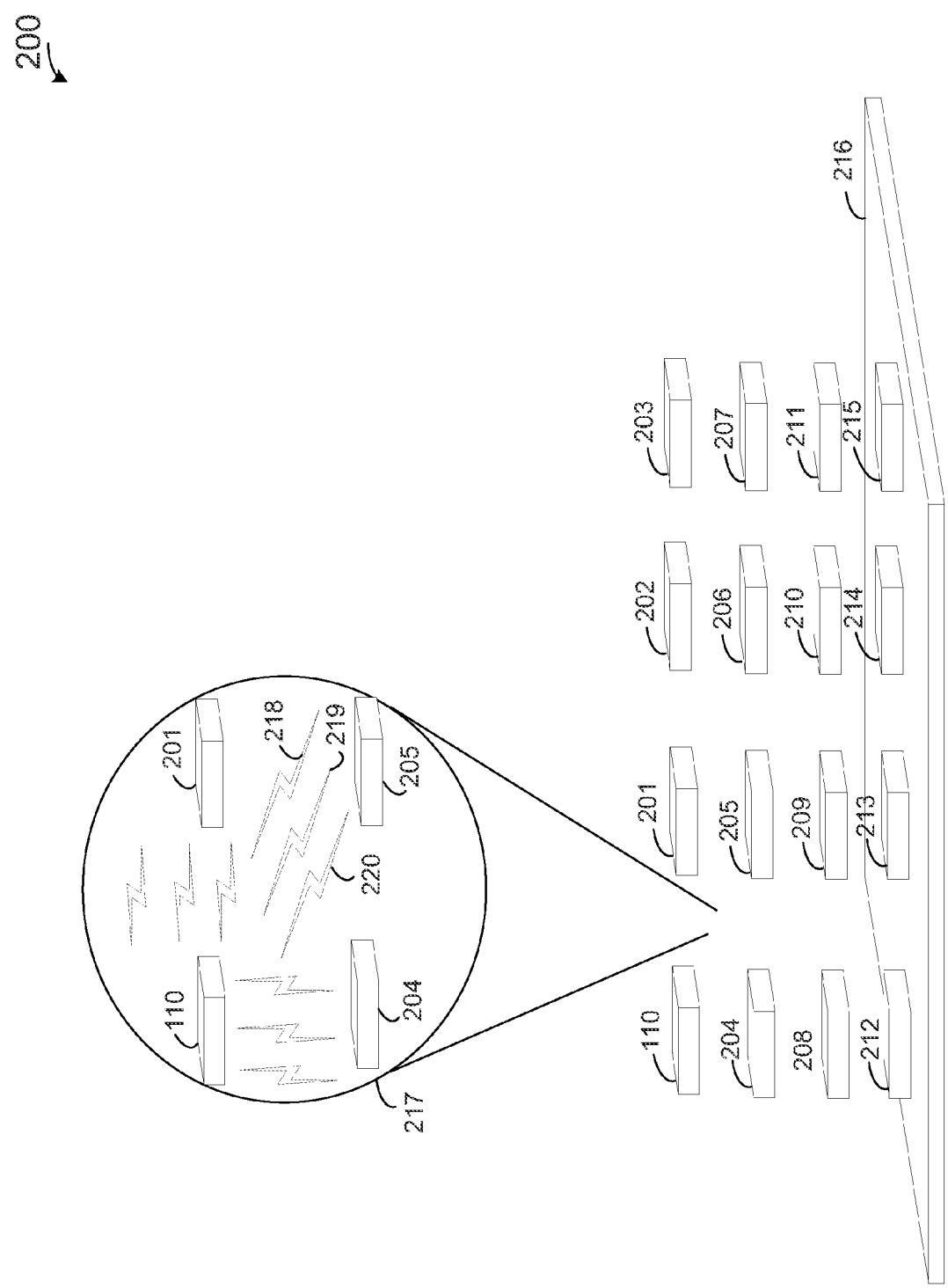
FIG. 2 is a diagram representing mobile computing devices, according to an example embodiment, organized as a mesh network, where the mobile computing devices are stored for sale.

Illustrated is a system and method to transmit data and inductive power to a plurality of mobile computing devices organized into a mesh network. These mobile computing devices are able to exchange data and inductive power with adjacent mobile computing devices, where an inductive signal link, power channel and data channel have been established. A plurality of inductive signal links, referenced herein as inductive links, are used to establish paths within the mesh network between mobile computing devices. Inductive links are described in U.S. patent application Ser. No. 12/841,001 filed on Jul. 21, 2010 and titled "POWER BRIDGE CIRCUIT FOR BI-DIRECTIONAL INDUCTIVE SIGNALING" which is incorporated by reference in its entirety. These paths may be a shortest path between mobile computing devices. In one example embodiment, the mobile computing devices that make up the mesh network are stored for sale, and may be individually powered up or provided with data. Stored for sale, as used herein, includes being stacked on a pallet, stacked on a shelf, or stored in some other manner such that the mobile computing devices are physically proximate. Physically proximate includes a distance of 0-4 cm. These physically proximate mobile computing devices may be considered as adjacent within the mesh network.

A device identifier is used to uniquely identify a mobile computing device within the mesh network. Examples of a device identifier include: an International Mobile Equipment Identity (IMEI) (i.e., 14 digit number), an International Mobile Subscriber Identity (IMSI) (i.e., 15 digit number), an Mobile Subscriber Integrated Services Digital Network (ISDN) Number (MSISDNN) (i.e., 15 digit number), and a Mobile Equipment Identifier (MEID) (i.e., 18 digit number). As will be discussed in more detail below, in some example embodiments, this device identifier is passed through a hashing function(s) to generate a device identifier.

In some example embodiments, each mobile computing device in the mesh network build a routing table representing the mesh network and paths through the mesh network. This routing table may be queried for the purpose of generating an inventory of the devices that make up the mesh network. This inventory may be displayed on the screen or display of a mobile computing device as a list. This list may be stored as a character delimited flat file, or other suitable file. Each mobile computing device within the routing table is represented using the device identifier. This routing table is built via the exchange of data packet between mobile computing devices. An example of the structure and content of this data packet is provided in U.S. patent application Ser. No. 12/621,087 filed on Nov. 19, 2009 and titled "PORTABLE POWER SUPPLY DEVICE FOR MOBILE COMPUTING DEVICES" which is incorporated by reference in its entirety. As described below, the format of this data packet can leveraged to facilitate mobile compute device updating and inductive charging, where these mobile computing devices are organized as a mesh network.

In one example embodiment, an example data packet format is as follows in Table 1:

TABLE 1

Data Packet Format

| Byte 0 | Byte 1 | Byte 2 | Byte 3 |
|---|---|---|---|
| Command | Device Identifier #1 | Device Identifier #2 | Payload |

The Byte 0 field (referenced herein as the "Command" field) identifies commands being conveyed by the data packet. The Byte 1 and Byte 2 fields represent a unique device identifier in the form of a value between 0-255. The Byte 3 field represents a data payload, the nature of which is dictated by the Command field. Example command definitions are as follows:

TABLE 2

Update Command

| 0 | Device Identifier #1 | Device Identifier #2 | A link or hop value |
|---|---|---|---|

Table 2 show an example data packet used to update a routing table that resides on the mobile computing device. The update command, denoted via the value "0", instructs the mobile computing device receiving this packet that the data in Byte fields 1, 2 and 3 is to be used to update the routing table of the mobile computing device receiving this data packet. For example, if the mobile computing device receiving this data packet is using a link-state protocol, then a Boolean value may be included in the data payload denoting that an inductive link exists between the mobile computing devices identified in Byte fields 1 and 2. Alternatively, if a distance-vector routing protocol is being implemented, then a hop value (e.g., "3") may be included in the data payload denoting the number of hops between the mobile computing devices identified in Byte fields 1 and 2. Upon completion of the updating of the routing table, this data packet containing the update command is forward to an adjacent mobile computing device with which an inductive link has been established.

TABLE 3

Data Command

| 1 | Device Identifier #1 | Device Identifier #2 | Data payload |
|---|---|---|---|

Table 3 illustrates the command definition for a data command used to transmit data to a mobile computing device that is part of the mesh network. The update command is denoted via the value "1" and instructs the mobile computing device receiving this data packet that the data in Byte 3 field is to be provided to an application residing on the mobile computing device receiving the data packet. This data may be setting data to set particular functions resident on a mobile computing device, command data to initiate a particular function on the mobile computing device, or other suitable data. This application may be identified via a port value that is concatenated to the data in the data payload. The receiving mobile computing device is identified in Byte 2 field, whereas the sending mobile computing device is identified in Byte 1 field.

TABLE 4

Collision

| 2 | Device Identifier #1 | Device Identifier #2 | Data payload |
|---|---|---|---|

Table 4 illustrates the command definition for a data command used to resolve device identifier collisions between mobile computing devices that are part of the mesh network. The collision command is denoted via the value "2" and instructs the mobile computing device receiving this packet that there is a device identifier collision for the value in Byte 2 field. As a threshold matter, Byte 1 field identifies the mobile computing device that discovers the collision. As will be discussed in more detail below, if the mobile computing device receiving this data packet is not identified in Byte 2 field, then the data packet is forwarded to the mobile computing device closest (i.e., having the shortest path) to the mobile computing device identified in Byte 2 field. If the mobile computing device receiving this data packet is identified in Byte 2 field, then the receiving mobile computing device will generate a new data packet that includes: a new mobile device identifier assigned to be Byte 2 field, setting the Byte 1 field to the old device identifier that was the source of the collision, and the payload value in Byte 3 field set to a value representing a lock value for the new mobile device identifier. This new data packet will be broadcast to at least one mobile computing device in the mesh network. Where this new data packet is received by a mobile computing device, the routing table of that receiving mobile computing device will be updated such that the old device identifier in Byte 1 field is replaced with the new device identifier of Byte 2 field. Further, a lock value, or condition will be set for this new device identifier as it appears in the routing table of the mobile device receiving this new data packet. In some example embodiments, data packet broadcast latency in the mesh network, and the use of the lock values, ensures that the device identifier collision does not continue.

TABLE 5

| Power Up | | | |
|---|---|---|---|
| 3 | Device Identifier #1 | Device Identifier #2 | Data payload |

Table 5 illustrates the command definition for a data command used to power up a mobile computing device that is part of the mesh network. The power up command is denoted via, the value "3" and instructs the mobile computing device receiving this data packet that it should seek power from a mobile computing device with which it has an established inductive link. Often, adjacent mobile computing devices in the mesh network are positioned to provide an inductive charge. The actual inductive charging between adjacent mobile computing devices, where an inductive link exists between these devices, is described in U.S. patent application Ser. No. 12/621,087 filed on Nov. 19, 2009 and titled "PORTABLE POWER SUPPLY DEVICE FOR MOBILE COMPUTING DEVICES" and U.S. patent application Ser. No. 12/478766, filed Jun. 4, 2009, entitled INDUCTIVE SIGNAL TRANSFER SYSTEM FOR COMPUTING DEVICES, both of which are incorporated by reference in their entirety. In cases where inductively supplied electrical power cannot be supplied by an adjacent mobile computing device, the Byte 1 field of the data packet is assigned the device identifier for the mobile computing device seeking to be charged. The mesh network is flooded with the power up data packet seeking an electrical charge for the mobile computing device identified in Byte 1 field. The first mobile computing device identified that is capable of providing a charge to the mobile computing, device identified in Byte 1 field, establishes an inductive link with an adjacent mobile computing device that is in the shortest path between the first mobile computing device and the mobile computing device identified in Byte 1 field. Once the inductive link is established, electrical power is provided to the adjacent mobile computing device. The adjacent mobile computing device provides power to additional mobile computing devices in the shortest path that is adjacent to it. This process continues until the mobile computing device identified in Byte 1 field is provided electrical power. The shortest path can be determined using at least one of the link-state protocol or the distance-vector routing protocol, and associated shortest-path algorithms (e.g., Dijkstra's algorithm, Bellman-Ford algorithm, A* search algorithm, Floyd-Warshall algorithm, or Johnson's algorithm).

In some example embodiments, a routing table for a mobile computing device that is part of the mesh network shown herein is illustrated as follows:

TABLE 6

| Example Routing Table | | | |
|---|---|---|---|
|  | 221L | 2 | 43 |
| 221L | x | 1 | 2 |
| 2 | 1 | x | 2 |
| 43 | 2 | 2 | x |

As illustrated above, "221L" denotes a mobile computing device with device identifier of "221" and which is locked as denoted by "L". As illustrated, the "L" lock value is concatenated onto the device identifier. Additionally, this routing table is applying a form of the distance-vector routing protocol, hence shows the number of hops (e.g., "1" or "2") between mobile computing devices in the mesh network. In some example embodiments, this routing table may be queried to generate an inventory of mobile computing devices that make up the mesh network. This inventory may be used to: identify devices available for sale, inventory tracking purposes, or other suitable purposes.

FIG. 1a and 1b illustrate one example embodiment of a mobile computing device 110 that is used to build a routing map for a mesh network used for inductive charging and data transfer. FIG. 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, slate device, smartphone, netbook, or laptop computer. The mobile computing device 110 is configured to host and execute a phone application for placing and receiving telephone calls. In one example embodiment, the configuration as disclosed may be configured for use between a mobile computing device, that may be host device, and an accessory device.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with Public Switched Telephone Networks (PSTN) and/or data networks having Voice over Internet Protocol (VoIP) functionality. Likewise, the mobile computing device 110 is only by way of example, and the principles of its functionality apply to other computing devices, e.g., desktop computers, slate devices, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a Personal Digital Assistant (PDA) or a smart phone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from, for example, such as glass, plastic, thin-film or composite material. In one embodiment the screen may be 1.5 inches to 5.5 inches (or 4 centimeters to 14 centimeters) diagonally. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an Active-matrix OLED (AMOLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infra-red)) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130, in addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACT FLASH, SD CARD, XD CARD, MEMORY STICK, MULTIMEDIA CARD, SDIO, and the like.

FIG. 2 is a diagram representing mobile computing devices organized as a mesh network 200, where the mobile computing devices are stored for sale. Shown are mobile computing devices 110, and 201-215 organized as a mesh network 200. These mobile computing devices 110, and 201-215 are shown as residing on a pallet 216, and as readied for sale. Also illustrated is an exploded view 217 showing the mobile computing devices 110, 201, 204, and 205. These various mobile computing devices 110, 201, 204, and 205 communicate data across an inductive link 218 and data channel 219, and inductive power across a power channel 220. These mobile computing devices communicate with other physically proximate mobile computing devices with which an inductive link is established.

Figure 3:
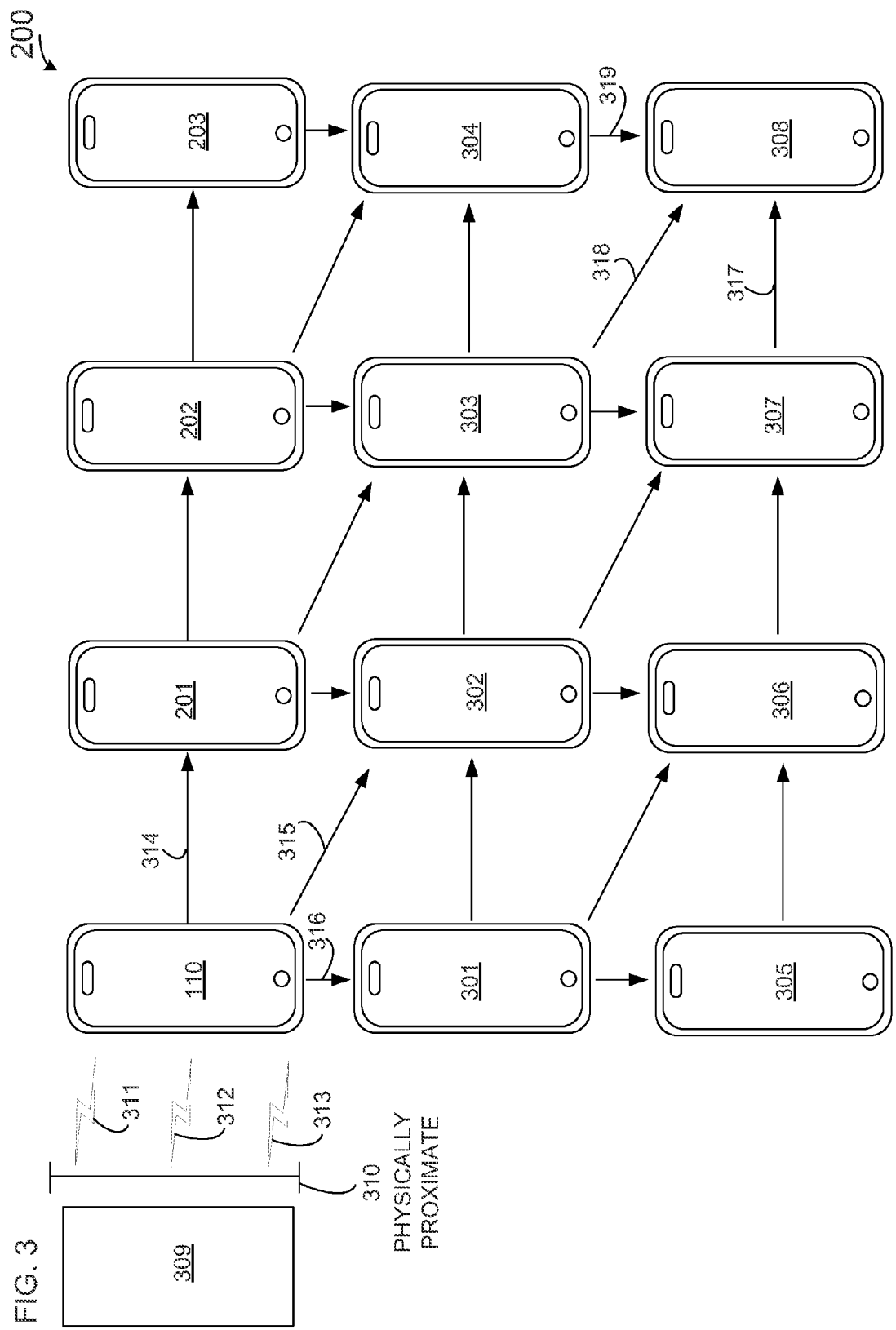
FIG. 3 is a diagram representing mobile computing devices, according to an example embodiment, organized as a mesh network, where inductive power and data is communicated across the mesh network using a flooding technique.

FIG. 3 is a diagram representing mobile computing devices organized as a mesh network 200, where inductive power and data is communicated across the mesh network using a flooding technique. As illustrated, a device 309 supplies data and inductive power to the mobile computing device 110. This device 309 may be mobile computing device, or other computer system capable to inductive charging and data transfer. The data and inductive power is supplied by the device 309 to the mobile computing device 110 using an inductive link 311, data channel 312 and inductive power channel 313. As illustrated by inductive links 314-316, the mobile computing device 110 is a source of inductive power and data for the mesh network 200. Further, as illustrated by inductive links 317-319 mobile computing device 308 an end point or sink for the inductive power and data for the mesh network 200.

Figure 4:
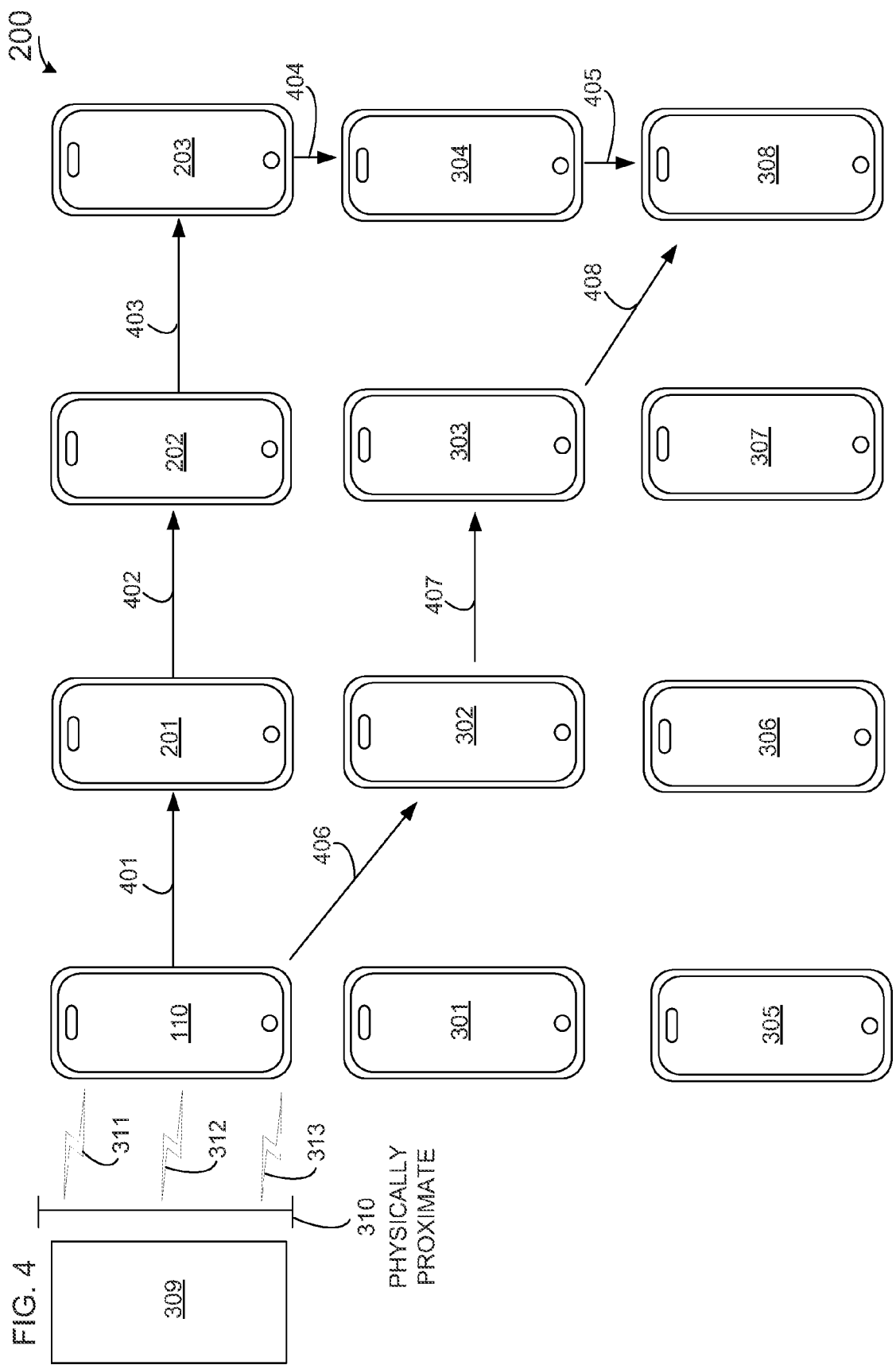
FIG. 4 is a diagram representing mobile computing devices, according to an example embodiment, organized as a mesh network, where inductive power and data is communicated across the mesh network using a routing technique.

FIG. 4 is a diagram representing mobile computing devices organized as a mesh network 200, where inductive power and data is communicated across the mesh network using a routing technique. This routing technique may use a routing table based upon a link-state protocol or a distance-vector routing protocol, whereby shortest paths through the mesh network are determined using a shortest-path algorithm. Shown is a path 401→402→403→404→405, where each link in the path is an inductive link. This path allow for data and inductive power to be transmitted from the device 309, and any mobile device on this path, to the mobile computing device 308. Also shown is a shortest path 406→407→408, where again each link in the path is an inductive link. This path also allow for data and inductive power to be transmitted from the device 309, and any mobile device on this path, to the mobile computing device 308.

Figure 5:
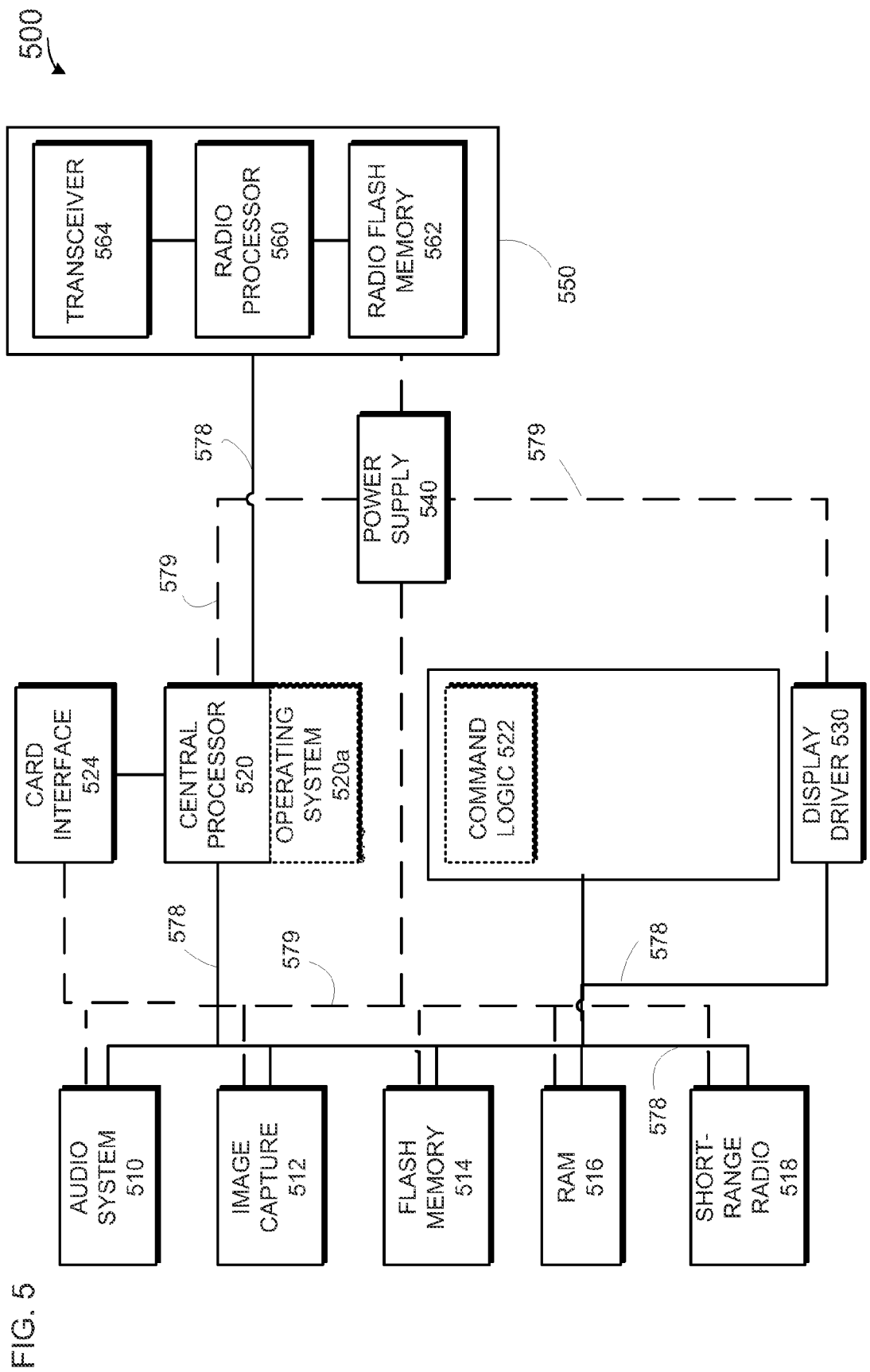
FIG. 5 is a block diagram that illustrates an architecture of a mobile computing device, according to an example embodiment, enabled to transmit data and inductive power to a plurality of mobile computing devices organized into a mesh network.

Referring next to FIG. 5, a block diagram illustrates an example architecture of a mobile computing device 110, enabled to transmit data and inductive power to a plurality of mobile computing, devices organized into a mesh network. By way of example, the architecture illustrated in FIG. 5 will be described with respect to the mobile computing device of FIG. 1a, 1b, 3, 4, or 5. The mobile computing device 110 includes a central processor 520, a power supply 540, and a radio subsystem 550. Examples of a central processor 520 include processing chips and system based on architectures such as ARM (including cores made by microprocessor manufacturers), ARM XSCALE, QUALCOMM SNAPDRAGON, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 520 is configured for operation with a computer operating system 520*a*. The operating system 520*a* is an interface between hardware and an application, with which a user typically interfaces. The operating system 520*a* is responsible for the management and coordination of activities and the sharing of resources of the mobile computing device 110. The operating system 520*a* provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, and WINDOWS MOBILE), SYMBIAN OS, RIM BLACKBERRY OS, APPLE OS (including MAC OS and IPHONE OS), GOOGLE ANDROID, and LINUX.

The central processor 520 communicates with an audio system 510, an image capture subsystem (e.g., camera, video or scanner) 512, flash memory 514, RAM memory 516, and a short range radio module 518 (e.g., Bluetooth, Wireless Fidelity (WiFi) component (e.g., IEEE 802.111, 802.20, 802.15, 802.16)). The central processor 520 communicatively couples these various components or modules through a data line (or bus) 578. The power supply 540 powers the central processor 520, the radio subsystem 550 and a display driver 530 (which may be contact- or inductive-sensitive). The power supply 540 may correspond to a direct current source (e.g., a battery pack, including rechargeable) or an alternating current (AC) source. The power supply 540 powers the various components through a power line (or bus) 579.

The central processor communicates with applications executing within the mobile computing device 110 through the operating system 520*a*. In addition, intermediary components, for example, a command logic module 522. The command logic module 522 allows for commands to be processed, where the commands are sent over an inductive link.

It is noted that in one embodiment, central processor 520 executes logic (e.g., by way of programming, code, or instructions) corresponding to executing applications interfaced through, for example, the navigation area 140 or switches. It is noted that numerous other components and variations are possible to the hardware architecture of the computing device 500, thus an embodiment such as shown by FIG. 5 is just illustrative of one implementation for an embodiment.

The radio subsystem 550 includes a radio processor 560, a radio memory 562, and a transceiver 564. The transceiver 564 may be two separate components for transmitting and receiving signals or a single component for both transmitting and receiving signals. In either instance, it is referenced as a transceiver 564. The receiver portion of the transceiver 564 communicatively couples with a radio signal input of the device 110, e.g., an antenna, where communication signals are received from an established call (e.g., a connected or on-going call). The received communication signals include voice (or other sound signals) received from the call and processed by the radio processor 560 for output through the speaker 120. The transmitter portion of the transceiver 564 communicatively couples a radio signal output of the device 110, e.g., the antenna, where communication signals are transmitted to an established (e.g., a connected (or coupled) or active) call. The communication signals for transmission include voice, e.g., received through the microphone of the device 110, (or other sound signals) that is processed by the radio processor 560 for transmission through the transmitter of the transceiver 564 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), High Speed Download Packet Access (HSDPA), High Speed Uplink Packet Access (HSUPA), and Worldwide Interoperability for Microwave Access (WiMAX).

While other components may be provided with the radio subsystem 550, the basic components shown provide the ability for the mobile computing device to perform radio-frequency communications, including telephonic communications. In an embodiment, many, if not all, of the components under the control of the central processor 520 are not required by the radio subsystem 550 when a telephone call is established, e.g., connected or ongoing. The radio processor 560 may communicate with central processor 520 using the data line (or bus) 578.

The card interface 524 is adapted to communicate, wirelessly or wired, with external accessories (or peripherals), for example, media cards inserted into the expansion slot (not shown). The card interface 524 transmits data and/or instructions between the central processor and an accessory, e.g., an expansion card or media card, coupled within the expansion slot. The card interface 524 also transmits control signals from the central processor 520 to the expansion slot to configure the accessory. It is noted that the card interface 524 is described with respect to an expansion card or media card; it also may be structurally configured to couple with other types of external devices for the device 110, for example, an inductive charging station for the power supply 540 or a printing device.

Figure 6:
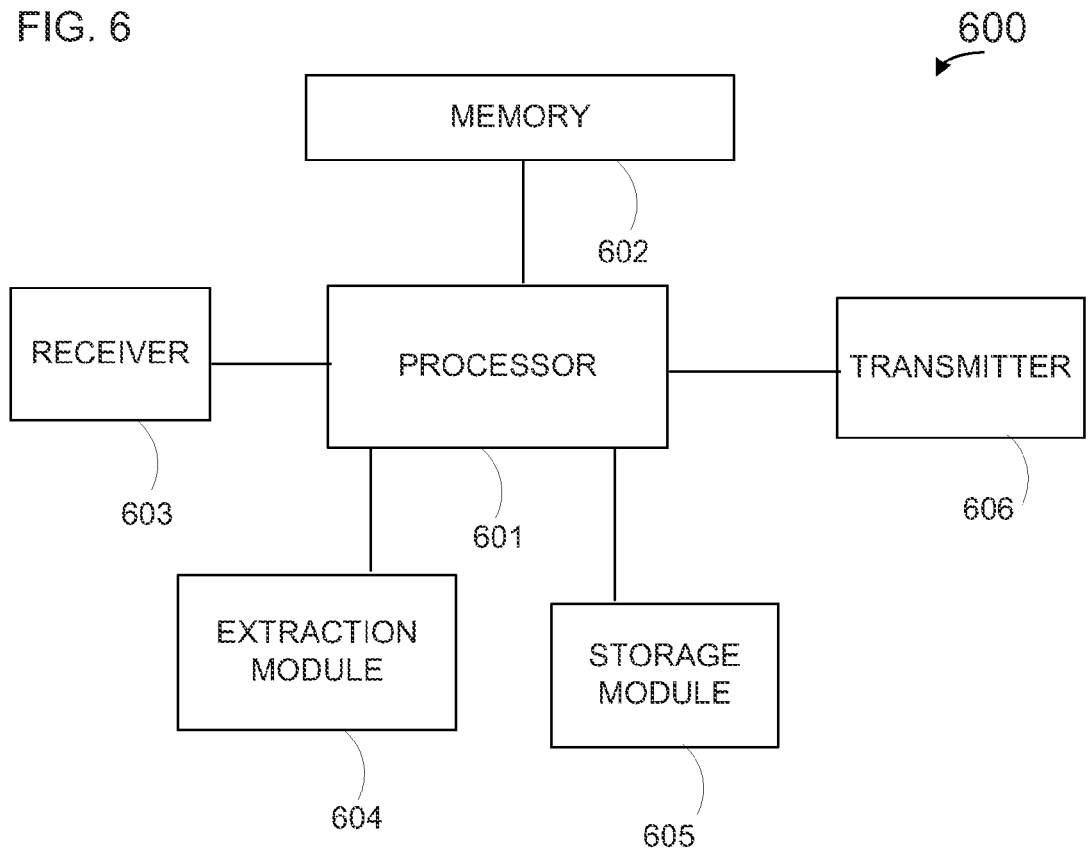
FIG. 6 is a block diagram of a system, according to an example embodiment, representing mobile computing device used in a mesh network, where inductive power and data is communicated across the mesh network.

FIG. 6 is a block diagram of an example system 600 representing mobile computing device used in a mesh network, where inductive power and data is communicated across the mesh network. The various blocks shown herein may be implemented in software, hardware, or firmware. These blocks my be operatively connected, where operatively connected includes a physical or logical connection. Shown is a processor 601 operatively connected to a memory 602. Operatively connected to the processor 601 is a receiver 603 to receive a data packet at a mobile computing device that is part of a plurality of mobile computing devices connected via inductive links and organized as a mesh network, the data packet including a data command. Operatively connected to the processor 601 is an extraction module 604 to extract data from a payload field that is part of the data packet. Operatively connected to the processor 601 is a storage module 605 to store the data to a memory that is part of the mobile computing device, the memory to be accessed by an application that resides upon the mobile computing device. Operatively connected to the processor 601 is a transmitter 606 to forward, via the inductive links, the data packet to an additional mobile computing device that is part of the plurality of mobile computing devices. In some example embodiments, the additional mobile-computing device is part of a path within the mesh network that includes at least the mobile-computing device, the additional mobile-computing device and another mobile-computing device. In some example embodiments, a data channel exists between the mobile-computing device and the additional mobile computing device. In some example embodiments, the data is setting data for the mobile computing device, to set the various capabilities of the mobile computing device. Additionally, in some example embodiments, the data includes port information to uniquely identify the application. Further, in some example embodiments, the data packet includes a command field, a first device identifier field, a second device identifier field and a payload field.

Figure 7:
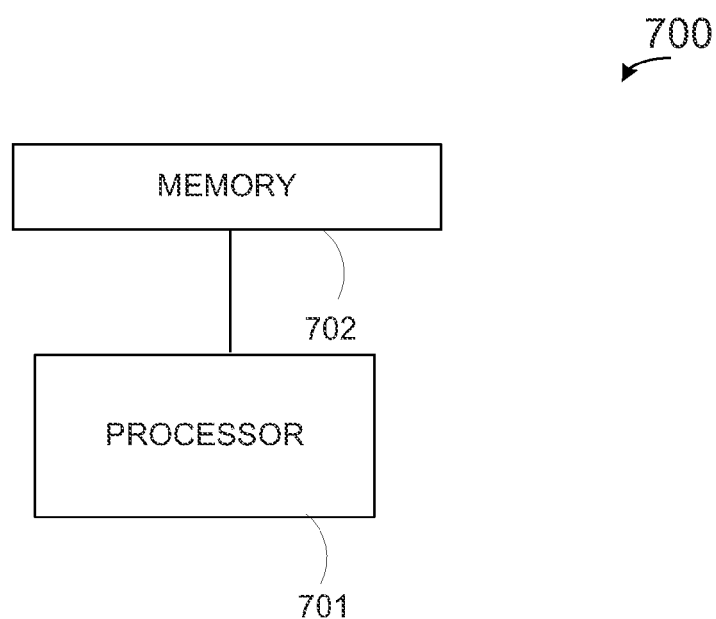
FIG. 7 is a block diagram of a system, according to an example embodiment, representing mobile computing device used in a mesh network, where inductive power and data is communicated across the mesh network.

FIG. 7 is a block diagram of an example system 700 representing mobile computing device used in a mesh network, where inductive power and data is communicated across the mesh network. The various blocks shown herein may be implemented in software, hardware, or firmware. These blocks may be operatively connected, where operatively connected includes a physical or logical connection. Shown is a processor 701 operatively connected to a memory 702. The memory 702 is in communication with the central processor 701, the memory 702 including logic encoded in one or more tangible media for execution and when executed operable to receive a data packet at a first mobile computing device that is part of a plurality of mobile computing devices organized as a mesh network, the data packet including an update up command. The logic may also be executed to get a device identifier that uniquely identifies the first mobile computing device within the mesh network. Further, the logic may be executed to establish an inductive link between the first mobile computing device and a second mobile computing device that are part of the mesh network, the inductive link used to establish a session for inductive charging and data transfer between the first and the second mobile computing devices. Moreover, the logic may be executed to broadcast the device identifier, based upon the inductive link, to the second mobile computing device. In some example embodiments, the device identifier is used to update a routing table that resides on the second mobile computing device. Additionally, in some example embodiments, the routing table is accessed for at least one of inventory tracking purposes, or sales purposes. The logic may also be encoded in one or more tangible media for execution and when executed operable to generate a hash of the device identifier.

Figure 8:
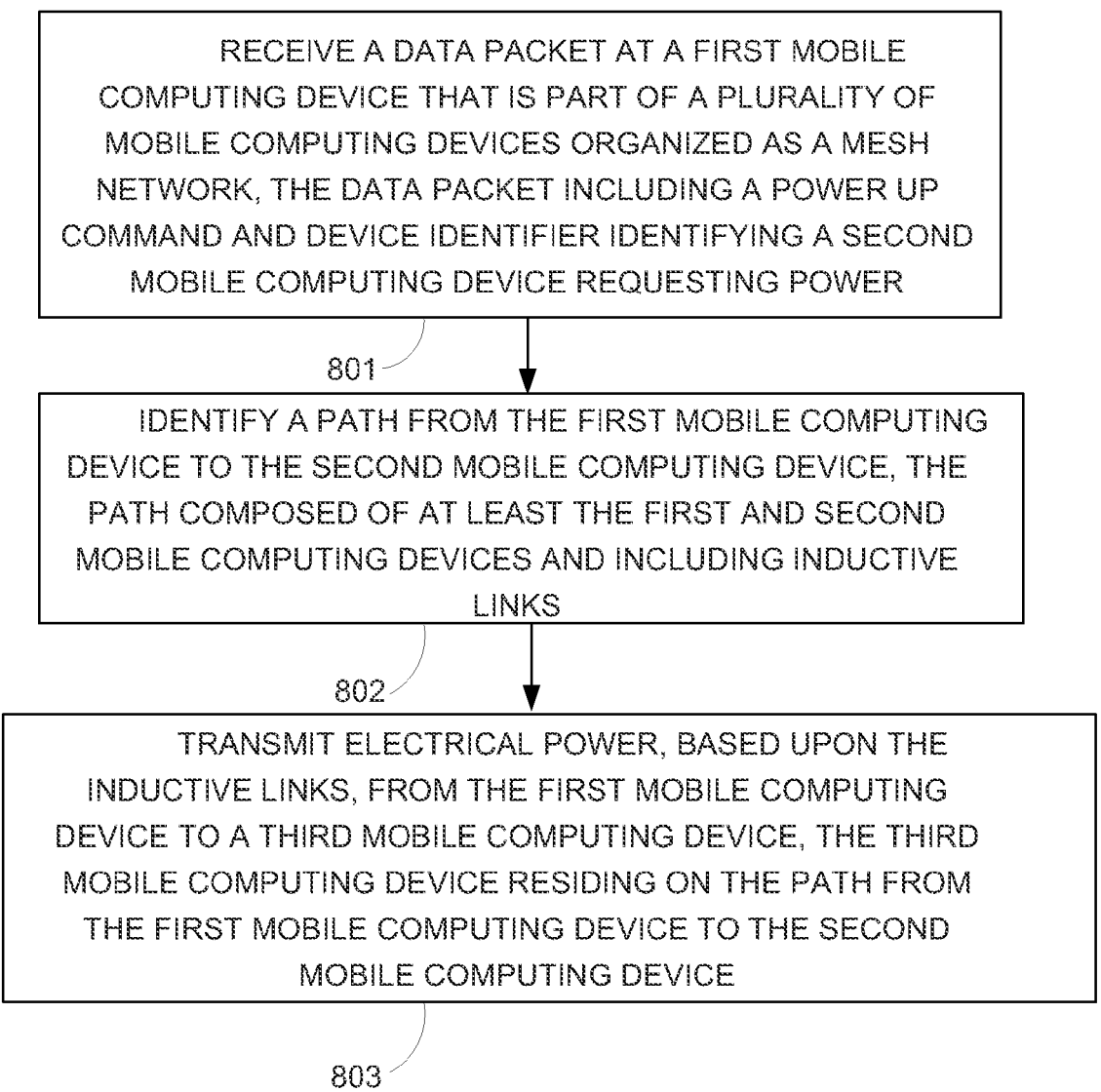
FIG. 8 is a flow chat illustrating a method, according to an example embodiment, to facilitate the transfer of inductive power and data across a mesh network using a mobile computing device.

FIG. 8 is a flow chat illustrating an example method 800 used facilitate the transfer of inductive power and data across a mesh network using a mobile computing device. Operations 801-803 may be executed as part of the command logic module 522. Operation 801 may be executed to receive a data packet at a first mobile computing device that is part of a plurality of mobile computing devices organized as a mesh network, the data packet including a power up command and device identifier identifying a second mobile computing device requesting power. Operation 802 may be executed to identify a path from the first mobile computing device to the second mobile computing device, the path composed of at least the first and second mobile computing devices and including inductive links. Operation 803 may be executed to transmit electrical power, based upon the inductive links, from the first mobile computing device to a third mobile computing device, the third mobile computing device residing on the path from the first mobile computing device to the second mobile computing device. In some example embodiments, the second and the third mobile computing devices are adjacent. In some example embodiments, the path includes at least one of a shortest path, or a serially-organized path. In some example embodiments, the transmitting of the electrical power is performed over an inductive power channel.

Figure 9:
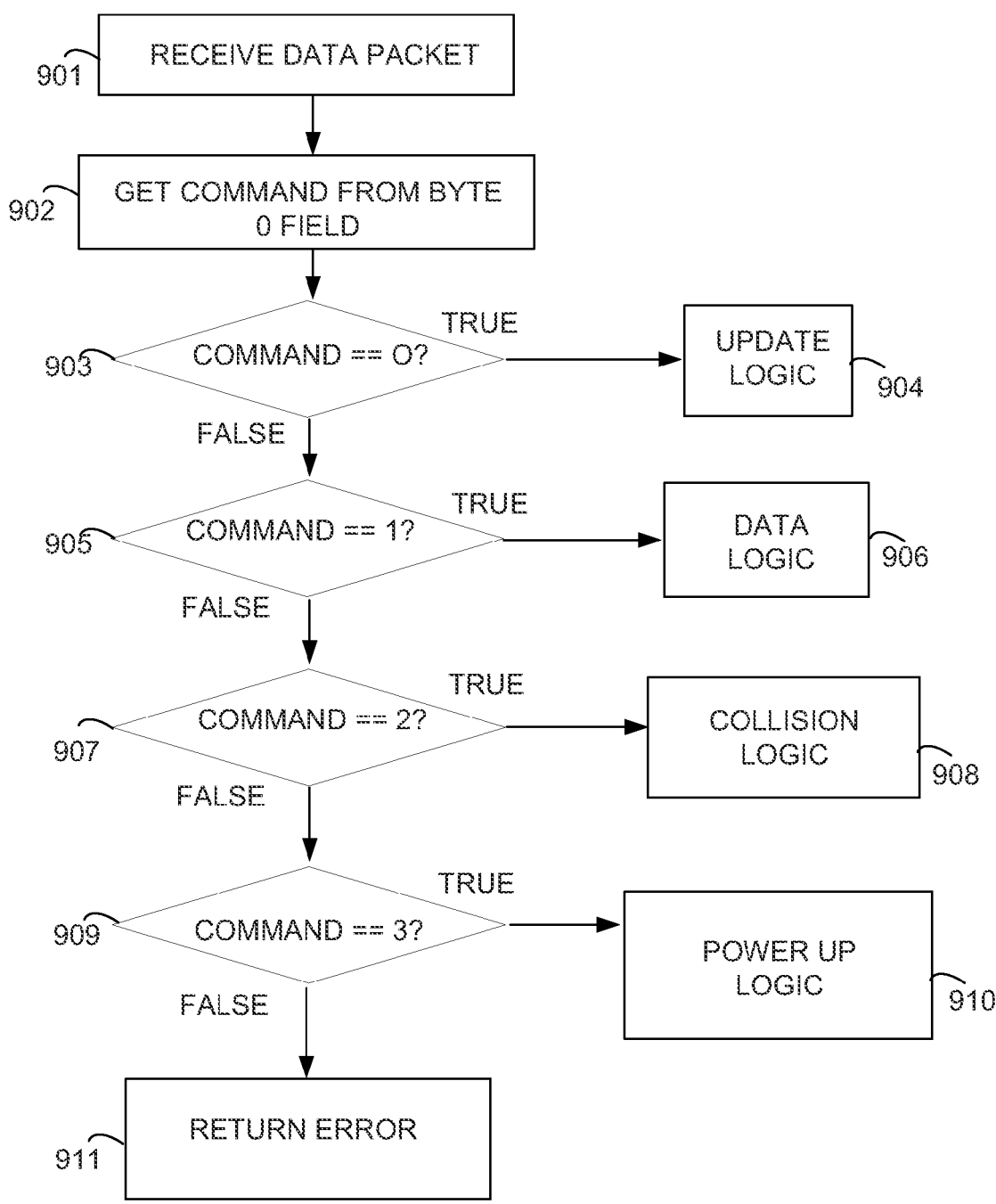
FIG. 9 is flow chart illustrating a method, according to an example embodiment, to execute a command logic module.

FIG. 9 is flow chart illustrating an example method to execute the command logic module 622. Show is an operation 901 that is executed to receive a data packet. This data packet may contain Byte fields 0, 1, 2, or 3 and the commands, device identifiers and payload associated therewith. Operation 902 is executed to get a command from Byte 0 field. A command may include an update command ("0"), data command ("1"), collision command ("2"), or power up command ("3"). A decision operation 903 is executed to determine whether the command is an update command. In cases where decision operation 903 evaluates to "true" an operation 904 is executed. Operation 904 executes update logic. In cases where decision operation 903 evaluates to "false", a decision operation 905 is executed. Decision operation 905 is executed to determine whether the command is a data command. In cases where decision operation 905 evaluates to "true" an operation 906 is executed. Operation 906 executes data logic. In cases where decision operation 905 evaluates to "false", a decision operation 907 is executed. Decision operation 907 is executed to determine whether the command is a collision command. In cases where decision operation 907 evaluates to "true" an operation 908 is executed. Operation 908 executes collision logic. In cases where decision operation 907 evaluates to "false", a decision operation 909 is executed. Decision operation 909 is executed to determine whether the command is a power up command. In cases where decision operation 909 evaluates to "true" an operation 910 is executed. Operation 910 is power up logic. In cases where decision operation 909 evaluates to "false", an operation 911 is executed that returns an error notification or throws an exception.

Figure 10:
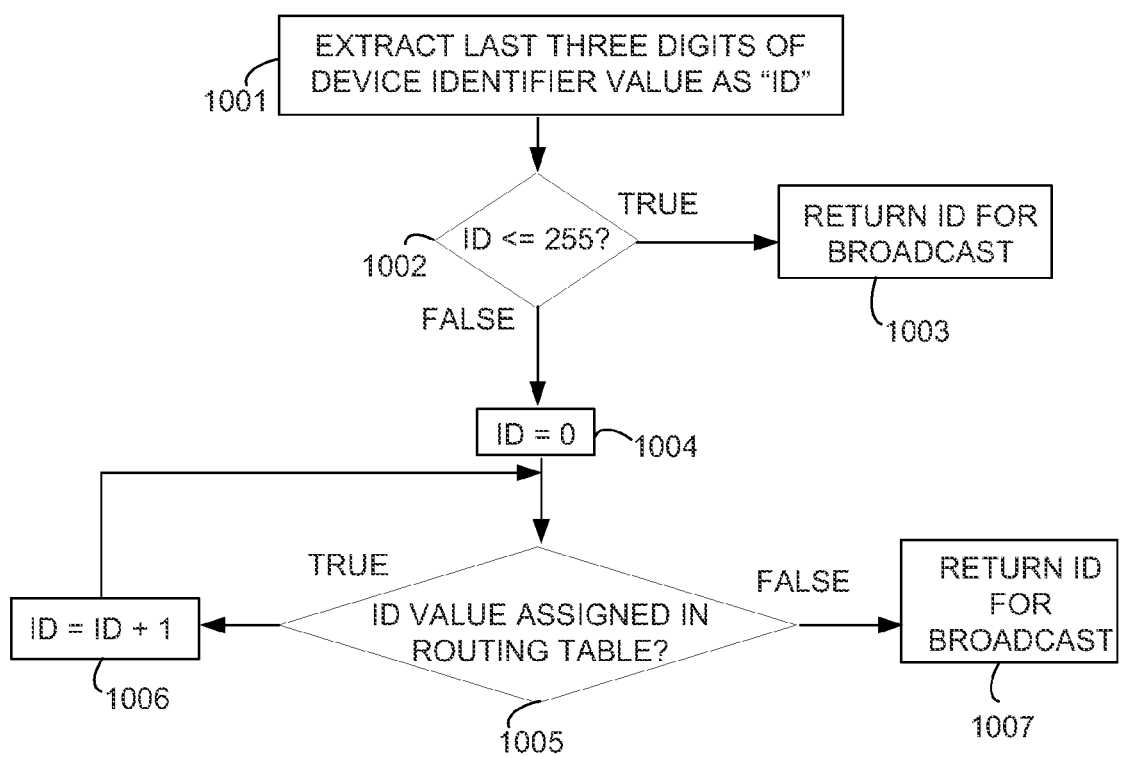
FIG. 10 is a flow chart illustrating the example execution of update logic.

FIG. 10 is a flow chart illustrating the example execution of the update logic 904. Shown is an operation 1001 that extracts the last three digits of the device identifier. These last three digital are represented herein as "ID". As previously discussed, the device identifier may be an IMEI value, an IMSI value, an MSISDNN value or some other suitable value that serves to uniquely identify a mobile computing device. A decision operation 1002 is executed to determine whether "ID" is less than or equal to 255, where 255 is the size of the Byte 1 or 3 fields. In cases where decision operation 1002 evaluates to "true", operation 1003 is executed in cases where decision operation 1002 evaluates to "false", operation 1004 is executed. Operation 1003 is executed to return the "ID" value for broadcast within the mesh network. Operation 1004 is executed to set the "ID" value to "0". Decision operation 1005 is executed to determine whether the "ID" value has been assigned to the routing table residing on the mobile computing device. In cases where decision operation 1005 evaluates to "false" an operation 1007 is executed, and the "ID" value is returned for broadcast within the mesh network. In cases where decision operation 1005 evaluates to "true" an operation 1006 is executed. Operation 1006 is executed to increment the "ID" value by one. Upon the execution of operation 1006, the decision operation 1005 is re-executed. In some example embodiments, some other suitable hash function may be used in lieu of the update logic 904.

Figure 11:
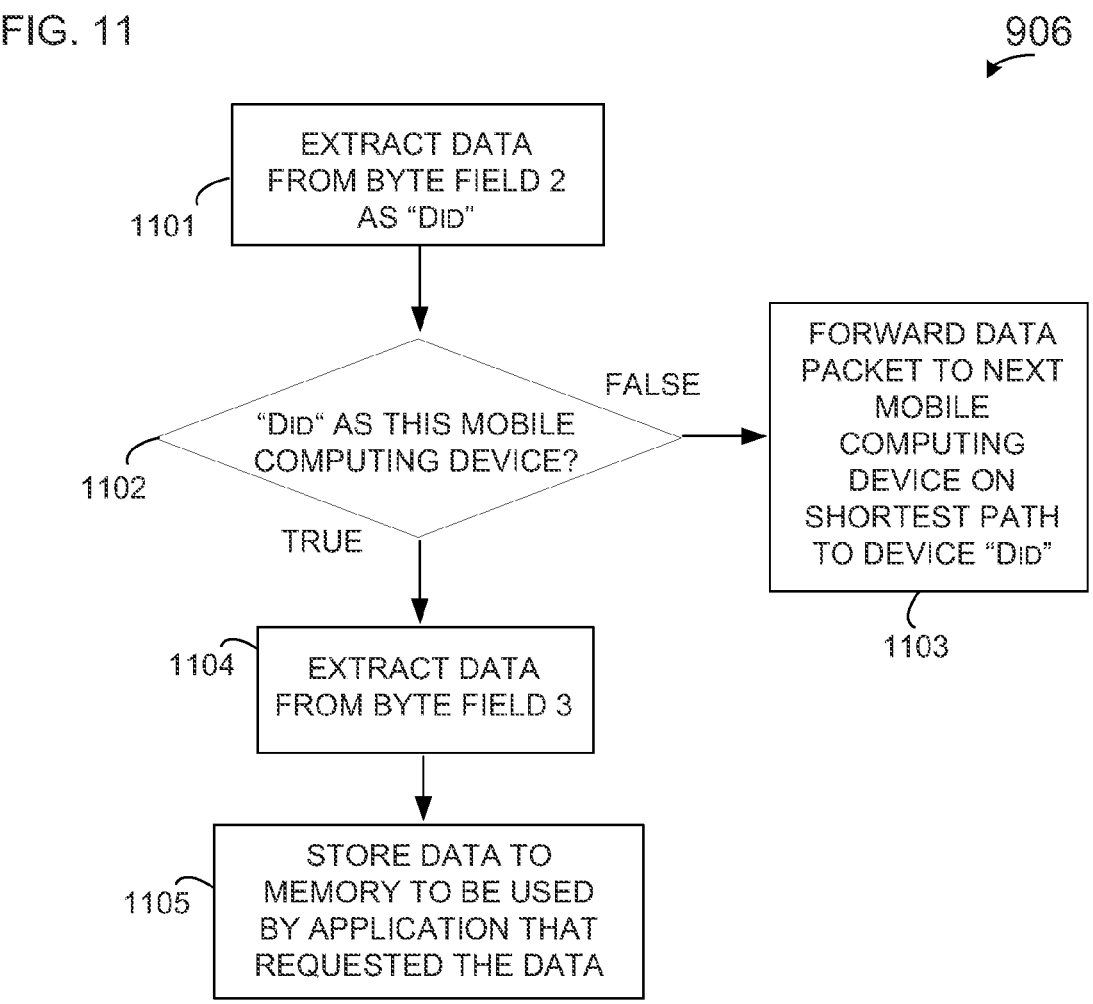
FIG. 11 is a flow chart illustrating the example execution of data logic.

FIG. 11 is a flow chart illustrating an example execution of data logic 906. Operation 1101 is executed to extract data from the Byte 2 field of the received data packet, the data represented herein as a "$D_{ID}$" value. A decision operation 1102 is executed to determine whether the "$D_{ID}$" value is for the current mobile computing device executing the data logic 906 (i.e., "this" mobile computing device). In cases where decision operation 1102 evaluates to "false" an operation 1103 is executed. In cases where decision operation 1102 evaluates to "true" an operation 1104 is executed. Operation 1103 is executed to forward the data packet to the next mobile computing device on the shortest path to the mobile computing device identified by the "$D_{ID}$" value. In some example embodiments, operation 1103 is executed to send the data packet to an adjacent mobile computing device, irrespective of whether this adjacent mobile computing device is part of a shortest path to the mobile computing device identified by the "$D_{ID}$" value. In cases where the decision operation 1102 evaluates to "true", an operation 1104 is executed. Operation 1104 is executed to extract data from the Byte 3 field. Operation 1105 is executed to store the data extracted from the Byte 3 field to memory, the memory used by an application the requested the data. In some example embodiments, a port value may be part of the extracted data so as to identify a destination application for the data.

Figure 12:
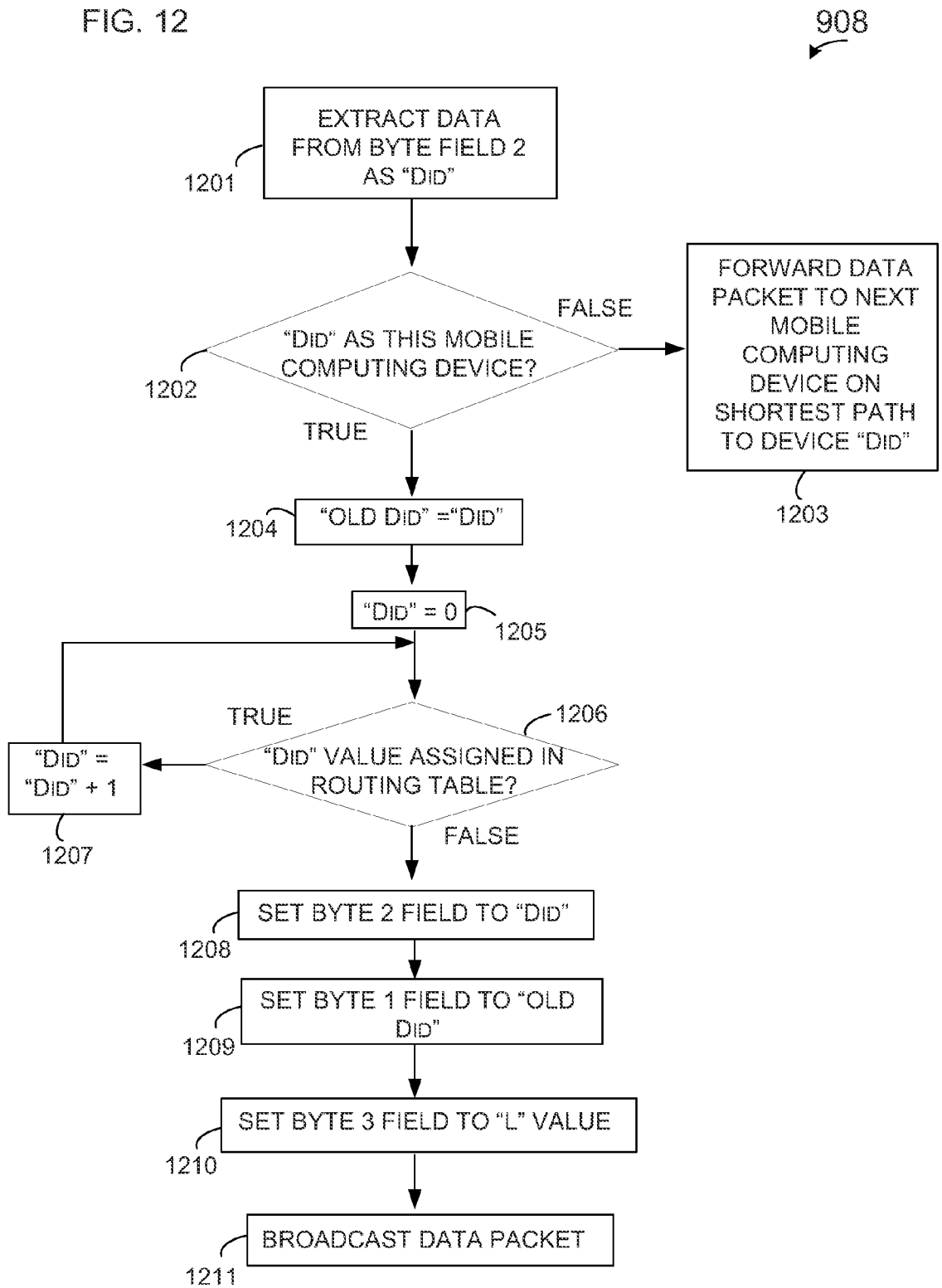
FIG. 12 is a flow chart illustrating the example execution of the collision logic.

FIG. 12 is a flow chart illustrating an example execution of the collision logic 908. Shown is an operation 1210 that is executed to extract data from the Byte 2 field, the data again represented as a "$D_{ID}$" value. Decision operation 1202 is executed to determine whether the "$D_{ID}$" value is for the current mobile computing device executing the data logic 908 (i.e., "this" mobile computing device). In cases where decision operation 1202 evaluates to "false" an operation 1203 is executed. Operation 1203 is executed to forward the data packet to the next mobile computing device on the shortest path to the mobile computing device identified by the "$D_{ID}$" value. In some example embodiments, operation 1203 is executed to send the data packet to an adjacent mobile computing device, irrespective of whether this adjacent mobile computing device is part of a shortest path to the mobile computing device identified by the "$D_{ID}$" value. In cases where the decision operation 1202 evaluates to "true", an operation 1204 is executed to assign the "$D_{ID}$" value to a new variable called "OLD $D_{ID}$" value. Operation 1205 is executed to assign "0" to the "$D_{ID}$" value. Decision operation 1206 is executed to determine whether the "$D_{ID}$" value is assigned to a mobile computing device within the routing table. In cases where the decision operation 1206 evaluates to "true" an operation 1207 is executed. Operation 1207 increments the "$D_{ID}$" value by 1 and re-executes the decision operation 1206. In cases where decision operation 1206 evaluates to "false" an operation 1208 is executed. Operation 1208 sets the Byte 2 field to the "$D_{ID}$" value. Operation 1209 is executed to set the Byte 1 field to the "OLD $D_{ID}$" value. Operation 1210 is executed to set the Byte 3 field to a lock value "L". "L" may be a Boolean value, a number value, a symmetric or asymmetric key value, or some other suitable value denoting that the "$D_{ID}$" value cannot be changed in a routing table maintained by a mobile computing device within the mesh network. Operation 1211 is executed to broadcast the data packet to other mobile computing devices with the mesh network.

Figure 13:
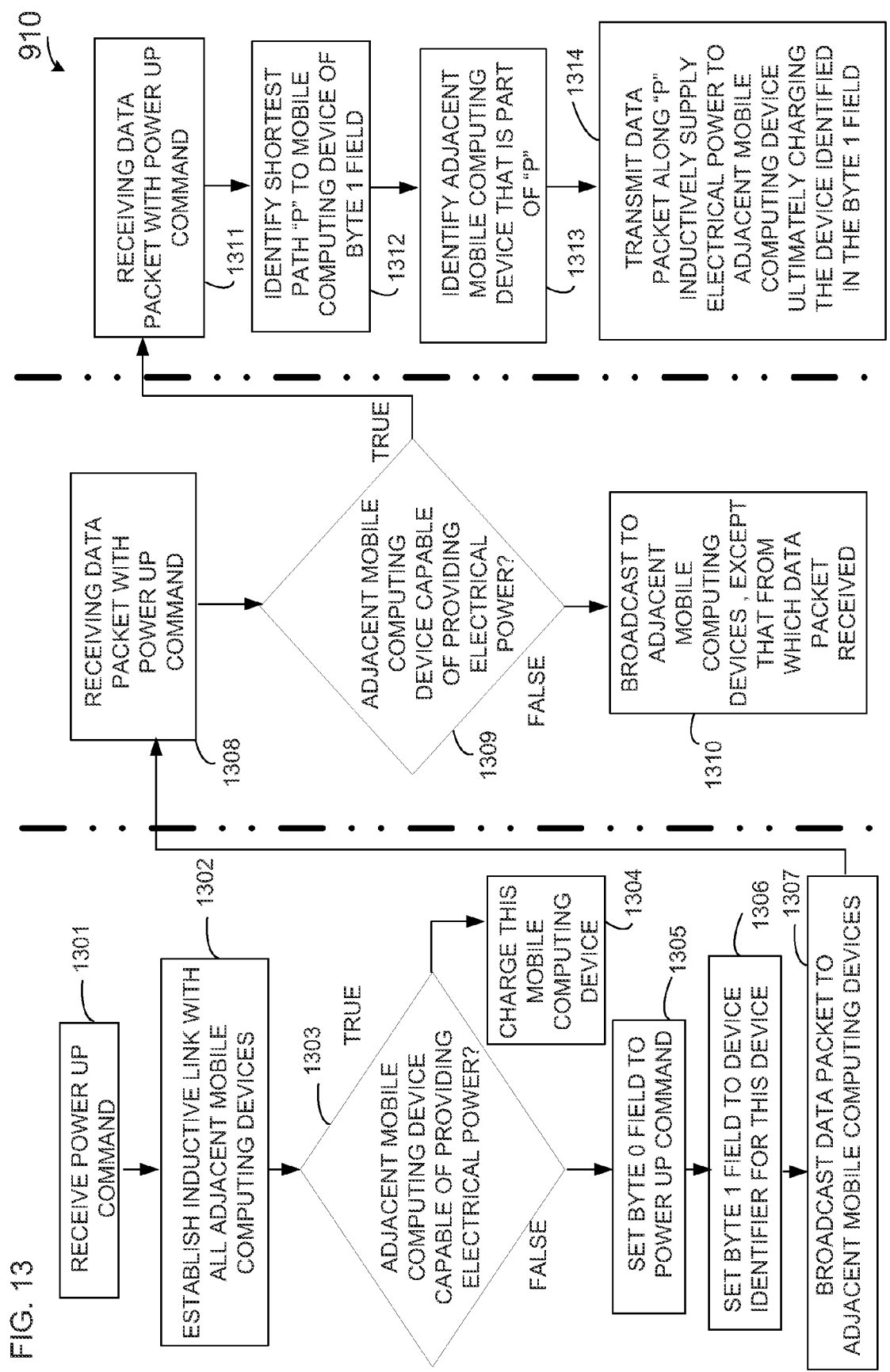
FIG. 13 is a tri-stream flow chart illustrating the execution of an example operation used to power up a mobile computing device that is part of a mesh network.

FIG. 13 is a tri-stream flow chart illustrating the execution of operation 910 used to power up a mobile computing device that is part of a mesh network. Shown are operations 1301-1307 that are executed by a first mobile computing device seeking to be charged inductively by other mobile computing devices within a mesh network. Also shown are operations 1308-1310 that are executed by a second mobile computing device from which inductive charging is requested. Further, shown are operations 1311-1314 that are executed by a third mobile computing device that is at least two hop away from the first mobile computing device, where a path exists between the first, second and third mobile computing devices. This path may be a shortest path, represented herein as "P", within the mesh network.

Operation 1301 is executed to receive a power up command. Operation 1302 is executed to establish an inductive link with all adjacent mobile computing devices. A decision operation 1303 is executed to determine whether any of the adjacent mobile computing devices are capable of inductively providing electrical power to the first mobile computing device. In cases where the decision operation evaluates to "true", an operation 1304 is executed. Operation 1304 is executed to charge the first mobile computing device (i.e., "this" mobile computing device) using inductive power from an adjacent mobile computing device. In cases where decision operation 1303 evaluates to "false" an operation 1305 is executed. Operation 1305 sets the Byte 0 field to the power up command denoted by "0". Operation 1306 is executed to set the Byte 1 field to the device identifier for the first mobile computing device. Operation 1307 is executed to broadcast the data packet with the updated fields (see operations 1305 and 1306).

Operation 1308 is executed to receive a data packet with a power up command. Decision operation 1309 is executed to determine whether any of the adjacent mobile computing devices are capable of inductively providing electrical power to the second mobile computing device. In cases where the decision operation evaluates to "true", an operation 1311 is executed. In cases where decision operation 1309 evaluates to "false", an operation 1310 is executed. Operation 1310 is executed to broadcast the data packet to mobile computing devices adjacent to the second mobile computing device. The first mobile computing device may be excluded from this broadcast.

Operation 1311 is executed to receive a data packet with a power up command. Assuming that the third mobile computing device can supply electrical power to the mobile computing device identified in the Byte 1 field (i.e., the first mobile computing device) of the data packet, an operation 1312 is executed. Operation 1312 is executed to identify the shortest path "P" to the mobile computing device identified in the Byte 1 field. Operation 1313 is executed to identify adjacent mobile computing devices that are part of "P". Operation 1314 is executed to transmit electrical power to the adjacent mobile computing device from the third mobile computing device. The process of charging the mobile computing devices that make up "P" will continue until the first mobile computing device is inductively charged. In some example embodiments, the third mobile computing device may be the device 309. Additionally, in some example embodiments, "P" is a path within the mesh network as opposed to a shortest path. This path may allow for the serial charging of mobile computing devices. Further, in some example embodiments, operations 1311-4314 may be used to provide data in lieu of electrical power to the mobile computing devices that make up "P".

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the "true" spirit and scope of the invention.

What is claimed is:

1. A computer-implemented method comprising:
receiving a data packet at a first mobile computing device that is part of a plurality of mobile computing devices organized as a mesh network, the data packet including a power up command and device identifier identifying a second mobile computing device requesting power;
identifying a path from the first mobile computing device to the second mobile computing device, the path composed of at least the first and second mobile computing devices and including inductive links; and
transmitting electrical power, based upon the inductive links, from the first mobile computing device to a third mobile computing device, the third mobile computing device residing on the path from the first mobile computing device to the second mobile computing device.

2. The computer-implemented method of claim 1, wherein the second and the third mobile computing devices are adjacent.

3. The computer-implemented method, wherein the path includes at least one of a shortest path, or a serially-organized path.

4. The computer-implemented method of claim 1, wherein the transmitting of the electrical power is performed over an inductive power channel.

5. A mobile-computing device comprising:
at least one processor;
a memory in communication with the at least one processor, the memory including logic encoded in one or more tangible media for execution to cause the at least one processor to:
receive a data packet at a first mobile computing device that is part of a plurality of mobile computing devices organized as a mesh network, the data packet including a power up command;
get a device identifier that uniquely identifies the first mobile computing device within the mesh network;
establish an inductive link between the first mobile computing device and a second mobile computing device that are part of the mesh network, the inductive link used to establish a session for inductive charging and data transfer between the first and the second mobile computing devices; and
broadcast the device identifier, based upon the inductive link, to the second mobile computing device.

6. The mobile-computing device of claim 5, wherein the device identifier is used to update a routing table that resides on the second mobile computing device.

7. The mobile-computing device of claim 6, wherein the routing table is accessed for at least one of inventory tracking purposes, or sales purposes.

8. The mobile-computing device of claim 5, further comprising the logic encoded in one or more tangible media for execution and when executed operable to generate a hash of the device identifier.

9. A mobile-computing device comprising:
a receiver to receive a data packet at a mobile computing device that is part of a plurality of mobile computing devices connected via inductive links and organized as a mesh network, the data packet including a data command;
an extraction module to extract data from a payload field that is part of the data packet and a device identifier of an additional mobile computing device from a first device identifier field that is part of the data packet;
a transmitter to forward, via the inductive links, the data packet to the additional mobile computing device that is part of the plurality of mobile complain devices, wherein the additional mobile-computing device is part of a path within the mesh network that includes at least the mobile-computing device, the additional mobile-computing device and another mobile-computing device; and
a storage module to store the data to a memory that is part of the mobile computing device, the memory to be accessed by an application that resides upon the mobile computing device.

10. The mobile-computing device of claim 9, wherein a data channel exists between the mobile-computing device and the additional mobile computing device.

11. The mobile-computing device of claim 9, wherein the data is setting data for the mobile computing device.

12. The mobile-computing device of claim 9, wherein the data includes port information to uniquely identify the application.

13. The mobile-computing device of claim 9, wherein the data packet further includes a command field and a second device identifier field.

14. The mobile-computing device of claim 13, wherein the payload field is battery charge information.

15. The mobile-computing device of claim 14, wherein the battery charge information is used to control the amount of power sent from the additional mobile-computing device.

* * * * *